United States Patent Office 3,754,054
Patented Aug. 21, 1973

3,754,054
RADIATION CURABLE COATING COMPOSITIONS AND PROCESS FOR THE PREPARATION THEREOF
Tadasu Kimura, Otake-shi, Hiroyuki Harada, Tokyo, and Juichi Kobayashi and Hideo Nakamoto, Otake-shi, Japan, assignors to Mitsubishi Rayon Company Limited, Tokyo, Japan
No Drawing. Filed Dec. 15, 1969, Ser. No. 885,272
Claims priority, application Japan, Dec. 23, 1968, 43/93,725
Int. Cl. B01j 1/10; C08f 27/12; C08g 39/10
U.S. Cl. 260—860                                    16 Claims

ABSTRACT OF THE DISCLOSURE

A coating composition useful for radiation curing is prepared through copolymerization of a mixture comprising a vinyl monomer having a hydroxyl group and $\alpha,\beta$-ethylenically unsaturated carboxylic ester of a monohydric alcohol, primary esterification of the hydroxyl group of the resultant copolymer with a polyhydric carboxylic acid anhydride in an organic solvent, and secondary esterification and/or etherification of carboxylic group and/or hydroxyl group of the primarily esterified copolymer with an epoxy vinyl monomer. The coating composition may further contain polymerizable and/or cross-linkage formable compounds active for radiation curing, for example, a compound of the formula:

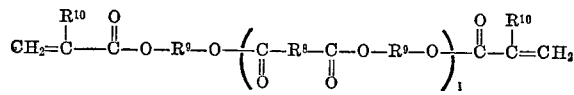

wherein $R^8$ is a divalent hydrocarbon group having 2 to 10C, $R^9$ is a saturated divalent hydrocarbon group of 2 to 10C, $R^{10}$ is hydrogen atom or methyl group and $l$ is 0 or 1 to 10.

---

The present invention relates to a coating composition which is valuable for obtaining film coatings having excellent coating features by radiation curing of radioactive energy such as electron beams, and ultra-violet rays and a process for preparing the composition.

Recently, based upon development of a charged particle accelerator, especially, a low volage, large power electron accelerator, a method for radioactively curing a film coating applied on a base material surface by action of electron beams has received public attention. Such public interest is based on the following:

(1) the radiation curing of film coating is completed at an ambient temperature without a heating operation in a time shorter than that of the heat-curing, and
(2) the radioactively cured film coatings have coating properties equal to or superior to those of the heat-cured film coatings.

The principle of the radiation curing method for film coating involves the inclusion of polymerizable components in the coating composition, having ethylenically unsaturated groups which are cured and inter- or intramolecularly cross-linked by effect of the radioactive energy so as to form insoluble and infusible coatings. It is well-known that the conventional coating materials containing an unsaturated polyester resin and an ethylenically unsaturated monomer are usable for a radiation curing process utilizing the action of electron beams. The conventional coatings cured by the radiation curing method have good coating properties but have some disadvantages such as insufficient weathering resistance, unsatisfactory adhesiveness to a base material surface or insufficient flexibility. Further, the above stated coating materials tend to form some inner stresses in the cured film coating owing to cross-linking between the componental molecules due to the effect of the electron beams, especially at a high dose rate thereof. If such shrinking occurs in the curing process, the resultant film coating has some stresses due to the shrinking. Such stresses produced in the film coating causes insufficient impact resistance, adhesiveness to a base material surface, flexibility and other inferior coating properties.

As one of the coating compositions capable of radiation curing with radioactive energy which is different from the above-stated coating composition mainly containing the unsaturated polyester resin, a coating composition containing a prepolymer of the formula:

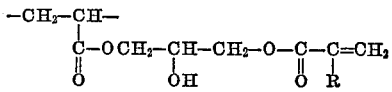

wherein R is hydrogen atom or lower alkyl group, is known. The above-stated prepolymer is prepared by addition reaction between a base polymer having glycidyl group, of the formula:

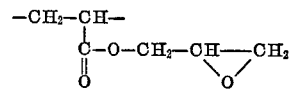

and an $\alpha,\beta$-ethylenically unsaturated carboxylic acid. However, the prepolymer has the disadvantage that the glycidyl group in the base polymer tends to cross-link intramolecularly and/or intermolecularly during the addition reaction and the cross-linking causes gelation of the coating composition. Especially, if a polymerizable monomer such as a vinyl monomer is used for dissolving the prepolymer, the above-stated tendency becomes very apparent. Further, the prepolymer's disadvantage is such that, the prepolymer is unsatisfactory for obtaining a film coating having high stiffness, high adhesiveness and other desirable coating properties. The disadvantage is caused by insufficient relaxation of the inner stress in the film coating during radiation curing and the insufficient relaxation is due to insufficient length of the pendent chain which is grafted to the base polymer and is effective for forming the cross-links.

Also, one of the well-known coating compositions usable for the radiation curing method is a coating composition containing a prepolymer of the unit formula:

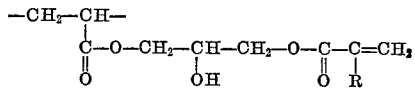

The prepolymer is prepared by addition reaction between a polymer having a carboxyl group and of the unit formula:

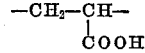

and a vinyl monomer having a glycidyl group. However, the prepolymer is unsatisfactory for obtaining a sufficient coated film due to the same reasons as described above. Also, coating compositions mainly containing polymerizable unsaturated compound such as condensation product of a polyol and an unsaturated carboxylic acid, and an addition product of epoxy resin and an $\alpha,\beta$-ethylenically unsaturated carboxylic acid are known. However, these compositions are also insufficient for obtaining desirable film coating due to the same reasons.

An object of the present invention is to provide a coating composition which is easily cured by radiation of radioactive energy such as electron beams and ultra-violet rays and is effective for forming a film coating having coating properties of the same degree as those of the film coating of the conventional thermosetting resin but not having the disadvantages as stated above.

Another object of the present invention is to provide a process for preparing the coating composition as stated above.

The coating composition of the present invention comprises a prepolymer effective for radiation curing and comprising the following componental units:

(1) a base copolymer having an average molecular weight of 1,000 to 100,000 and consisting of the following polymerization units:
(A) at least one vinyl monomer having a hydroxyl group, and
(B) at least one $\alpha,\beta$-ethylenically unsaturated carboxylic ester of a monohydric alcohol having 1 to 18 carbon atoms;
(2) at least one pendent polyhydric carboxylic acid residue unit attached to the base copolymer and primarily esterifying at least 10% by mol of the hydroxyl group of the base copolymer with carboxyl group thereof, and
(3) at least one pendent epoxy vinyl monomeric residue unit attached to the first esterified base copolymer and secondarily esterifying and/or etherifying at least 10% by mol of a total content of the hydroxyl group and carboxyl group of the first esterified base copolymer with epoxy groups thereof.

Preferably, the base copolymer in the prepolymer consists of 1 to 50% by weight of the unit A and 50 to 99% by weight of the unit B.

The preparation process of this coating composition comprises the following steps:

(1) Preparation of the base copolymer

A mixture containing 1 to 50% by weight of at least one kind of vinyl monomer having a hydroxyl group and 50 to 99% by weight of at least one kind of $\alpha,\beta$-ethylenically unsaturated carboxylic ester of a monohydric alcohol having 1 to 18 carbon atoms is copolymerized into a base copolymer having an average molecular weight of 1,000 to 100,000.

(2) Primary esterification

A polyhydric carboxylic acid anhydride is contacted with the base copolymer dissolved in an organic solvent in a mixing ratio of at least 0.1 mol with respect to the 1 mol of the hydroxyl group of the base copolymer in order to esterify the hydroxyl group of the base copolymer with the acid anhydride.

(3) Secondary esterification and/or etherification

An epoxy vinyl monomer is contacted with the primarily esterified base copolymer in the organic solvent in a mixing ratio of at least 0.1 mol with respect to 1 mol of a total of the hydroxyl group and carboxyl group of the primarily esterified base copolymer in order to secondarily esterify and/or etherify the hydroxyl group and/or carboxyl group of the primarily esterified base copolymer with the epoxy group of the epoxy vinyl monomer.

The base copolymer may be prepared by way of a solution polymerization, suspension polymerization, precipitation polymerization or bulk polymerization.

The unit A of the base copolymer may be selected from the vinyl monomers having a hydroxyl group of the Formulas I, II and III:

$$CH_2=C\underset{R^1}{|}-\underset{O}{\overset{||}{C}}-O-R-\underset{OH}{\overset{R^2}{|}}{\underset{|}{C}}-R^3 \qquad I$$

$$CH_2=C \begin{cases} \overset{O}{\overset{||}{C}}-O-R^5 \\ (CH_2)_m-\underset{O}{\overset{||}{C}}-O-R-\underset{OH}{\overset{R^2}{|}}{\underset{|}{C}}-R^3 \end{cases} \qquad II$$

$$\begin{matrix} CH-\overset{O}{\overset{||}{C}}-O-R^5 & R^2 \\ CH-\overset{||}{\underset{O}{C}}-O-R-\overset{|}{\underset{OH}{C}}-R^3 \end{matrix} \qquad III$$

in which $R^1$, $R^2$ and $R^3$ represent a hydrogen atom or methyl group, R represents $$-\left(\overset{R^4}{\underset{|}{C}H}\right)_n- \quad \text{or} \quad -\left(CH_2-\overset{R^4}{\underset{|}{C}H}-O\right)_m-$$

in which $R^4$ represents a hydrogen atom or methyl group and $n$ represents an integral number of 1 to 10, $R^5$ represents a hydrogen atom or alkyl group of 1 to 12 carbon atoms, and $m$ represents an integral number 1 or 2; allyl alcohol; methallyl alcohol; hydroxyalkyl acrylamide and hydroxyalkyl methacrylamide. The compounds of the Formula I concretely include the compounds as indicated below.

$$CH_2=CH-\overset{O}{\overset{||}{C}}-O-CH_2CH_2OH, \quad CH_2=\overset{CH_3}{\underset{|}{C}}-\overset{O}{\overset{||}{C}}-OCH_2CH_2OH$$

$$CH_2=CH-\overset{O}{\overset{||}{C}}-O-CH_2\overset{|}{\underset{OH}{C}}H-CH_3, \quad CH_2=\overset{CH_3}{\underset{|}{C}}-\overset{O}{\overset{||}{C}}-OCH_2\overset{|}{\underset{OH}{C}}H-CH_3$$

$$CH_2=CH-\overset{O}{\overset{||}{C}}-O-CH_2CH_2CH_2CH_2OH,$$

$$CH_2=\overset{CH_3}{\underset{|}{C}}-\overset{O}{\overset{||}{C}}-O-CH_2CH_2CH_2CH_2OH$$

$$CH_2=CH-\overset{O}{\overset{||}{C}}-O-(CH_2)_5CH_2OH, \quad CH_2=\overset{CH_3}{\underset{|}{C}}-\overset{O}{\overset{||}{C}}-O-(CH_2)_5OH$$

$$CH_2=CH-\overset{O}{\overset{||}{C}}-O-(CH_2CH_2O)_nCH_2OH,$$

$$CH_2=\overset{CH_3}{\underset{|}{C}}-\overset{O}{\overset{||}{C}}-O-(CH_2CH_2O)_nCH_2OH$$

The compounds of the Formula II concretely include mono-(2-hydroxyethyl) itaconate, methyl-(2-hydroxyethyl) itaconate and (2-hydroxyethyl)-α-methylene glurarate. Also, the compounds of the Formula III concretely include mono-(2-hydroxyethyl) maleate, methyl-(2-hydroxypropyl) maleate, butyl-(2-hydroxyethyl) maleate and octyl-(2-hydroxypropyl) maleate. The unit A may be contained in the base copolymer in a content of 1 to 50% by weight. Preferably 15 to 50% by weight. If the content of the unit A is less than 1%, the prepolymer prepared from the base copolymer has low sensitivity to radiation curing. On the other hand, if the content of the unit A is more than 50%, the resultant film coating is brittle whereas the sensitivity to radiation curing thereof is satisfactory.

The unit B in the base copolymer may be selected from esters obtained from $\alpha,\beta$-ethylenically unsaturated carboxylic acid such as acrylic acid, methacrylic acid, itaconic acid and α-methylene glutaric acid and monohydric alcohol having 1 to 18 carbon atoms such as straight or branched aliphatic monohydric alcohol of 1 to 18 carbon atoms, cyclohexanol, phenol, benzyl alcohol, phenethyl alcohol, ethylene glycol mono-lower alkyl ether. The content of the unit B in the base copolymer is required to be 50 to 99% by weight, because, the base copolymer comprising the unit B is effective with respect to activation by radiation energy and thus for forming cross-links, and a coating composition containing a prepolymer comprising the unit B results in a film coating having an excellent weathering resistance and high chemical-resistance.

The polyhydric carboxylic acid anhydride to be attached initially to the base copolymer is selected from saturated and unsaturated carboxylic acid anhydrides having at least two carbonyl groups, for example, maleic acid anhydride, chlorinated maleic acid anhydride, succinic acid anhydride, itaconic acid anhydride, α-methylene glutaric acid anhydride, citraconic acid anhydride, phthalic acid anhydride, tetrahydrophthalic acid anhydride, hexahydrophthalic acid anhydride, naphthalene dicarboxylic acid anhydride, dodecyl succinic acid anhydride and 1,4,5,6,7,7-hexachloro-bi-cyclo-[2,2,1]hept-6-en-2,3-dicarboxylic acid anhydride. These polyhydric carboxylic acid anhydrides are effective for preventing the film coating from shrinking during radiation curing. If an unsaturated polyhydric carboxylic acid anhydride is used as a first esterifying agent, it is also effective as a cross-linking agent by radiation curing. The polyhydric carboxylic acid anhydride should be attached to the base copolymer so as to esterify at least 10% by mol of the hydroxyl group of the base copolymer with the carboxyl group thereof. If the esterification ratio is less than 10% by mol, the resultant prepolymer has a low sensitivity to radiation curing. However, the polyhydric carboxylic acid anhydride may be mixed into the esterification system at a mixing ratio larger than 1.0 mol with respect to 1 mol of the hydroxyl group of the base copolymer.

The epoxy vinyl monomer to be attached secondarily to the base copolymer may be selected from α,β-ethylenically unsaturated carboxylic esters of epoxy alkyl compounds such as glycidyl acrylate, glycidyl methacrylate, allyl glycidyl ether, methallyl glycidyl ether and vinyl cyclohexane monoxide, and glycidyl ethers of a vinyl monomer having a hydroxyl group.

The epoxy vinyl monomer should be attached to the initially esterified base copolymer so as to esterify and/or etherify at least 10% by mol of a total content of the hydroxyl group and carboxyl group of the initially esterified base copolymer with the epoxy group thereof. If the esterification and/or etherification ratio is less than 10% by mol, the resultant prepolymer has a low sensitivity to radiation curing. However, the mixing ratio of the epoxy vinyl monomer may be larger than 1.0 mol with respect to 1 mol of the total content of the hydroxyl group and the carboxyl group of the firstly esterified base copolymer.

The prepolymer according to the present invention has the following advantages:

(1) easy preparation, because the primary esterification and secondary esterification and/or etherification are quantitatively and easily carried out,
(2) rapid curing by radioactive energy, and
(3) superior features of resultant film coating.

For example, a prepolymer prepared from maleic acid anhydride as a first esterification agent and glycidyl acrylate as a second esterifying and/or an etherifying agent has a pendent unit of the formula:

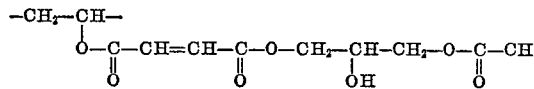

and has a radiation sensitiveness higher than that of the conventional prepolymer, owing to a long pendent group grafted to the base copolymer and having an active double bond at an end thereof.

Further, the prepolymer stated above forms a three dimensional structure by the cross-linking reaction between active radicals produced in the prepolymer by effect of electron beams and the double bonds of the pendent group with high rapidity. Therefore, the coating composition containing this prepolymer can be rapidly gelled by radiation curing.

The prepolymer, according to the present invention, further has an advantage that due to the long pendent group having a polymerizable double bond at an end thereof, the prepolymer does not result in any undesirable shrinking in the film coating during radiation curing, and thus, results in a film coating having no inner stress.

The first esterification and the second esterification and/or etherification may be carried out under a non-catalyst condition. However, it is desirable that these reactions be completed within a short time at a relatively lower temperature in consideration of the desired features of the resultant film coating. For this purpose, use of a basic catalyst is very effective. Vinyl monomers having a tertiary amine group are especially effective for accelerating these reactions without any undesirable side-reactions and have no undesirable effect on the properties of resultant film coating. The tert-amine catalyst may be selected from compounds of the Formula IV:

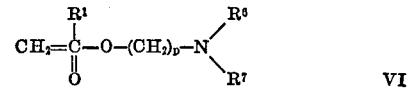

wherein $R^1$ represents a hydrogen atom or methyl group, $R^6$ and $R^7$ represent a methyl or ethyl group, respectively, and $p$ represents an integer of 1 or 2, for example, dimethylaminoethyl acrylate, dimethylaminoethyl methacrylate, diethylaminoethyl acrylate, diethylaminoethyl methacrylate, N-dimethyl acrylamide, N-dimethyl methacrylamide, 2-vinyl pyridine, 2-methyl-5-vinyl pyridine, 3-ethyl-5-vinyl pyridine, 5-butyl-2-vinyl pyridine and the like. These catalytic compounds may be added into each reaction system of the first and second esterifications. Particularly, dimethylaminoethyl acrylate or methacrylate are very effective for these reactions.

Also, these catalysts may be comprised in the base copolymer as a polymerization unit. Such a base copolymer is effective for accelerating the esterifications and decreasing the side-reactions during the esterifications.

The catalyst is added into a prepolymer preparing system in a range from 0.5 to 20% based on the weight of the base copolymer. Addition of the catalyst in a range less than 0.5% by weight causes an insufficient esterification and/or etherification of the base copolymer, but, addition of the catalyst in a range larger than 20% by weight results in an undesirable colored coating composition. Usually, the first esterification and the second esterification and/or etherification of the base copolymer are carried out under conditions wherein a base copolymer is dissolved in an organic solvent in a content of 10 to 80% by weight. Toluene, xylene, acetone, methylethyl ketone, methyl-isobutyl ketone, ethylacetate, butyl acetate, diisobutyl ketone, acetic ester of ethylene glycol monoethyl ether, are usable for the purpose. Particularly, it is most preferable that the base copolymer be dissolved in a vinyl compound which can be radically polymerized by radiation of radioactive energy and can dissolve or microfinely disperse the resultant prepolymer from the base copolymer. In such a case, since the coating comopsition containing this vinyl compound as the solvent can be solidified entirely by radiation energy, loss of the solvent does not occur during the radiation curing. Therefore, the coating composition containing a polymerizable solvent is economically valuable.

The polymerizable solvent may be selected from ethylenically unsaturated carboxylic esters of monohydric alcohol having 1 to 18 carbon atoms, such as acrylic esters and methacrylic esters of monohydric alcohol such as methanol, ethanol, butanol, isobutyl alcohol, 2-ethylhexanol, benzyl alcohol, cyclohexanol and phenethyl alcohol, ethyleneglycol monoalkyl ether, propylene glycol monoalkyl ether and esters of the Formula V:

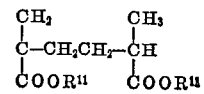

wherein $R^{11}$ represents a hydrogen atom or lower alkyl group. Also, the polymerizale solvent may be selected from vinyl monomers which are liquid at room temperature, such as triallyl isocyanurate, ethylene glycol dimethacrylate and diallyl phthalate. In consideration of the desired film coating features of the film, it is preferable that the polymerizable solvent, particularly, acrylic esters or methacrylic esters, be contained in the coating composition in a content of at least 30% by weight.

The coating composition of the present invention may be prepared by a process in which the first esterification

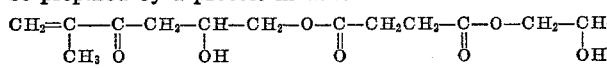

and the second esterification and/or etherification are carried out in a reaction system containing a base copolymer and a solvent containing 2 to 80% of the following compounds (a), (b), (c) or (d) based on a total weight of the solvent. Such a process is valuable for producing a coating composition very active with respect to radiation energy, and for obtaining a film coating having excellent coating features.

(a) Vinyl monomers having a hydroxyl group

This group is inclusive of the compounds of the Formulas I, II and III. For example, the coating composition prepared using a solvent containing 2-hydroxyethyl methacrylate, maleic acid anhydride as a first esterifying agent and glycidyl methacrylate as a second esterifying agent, contains a prepolymer having a pendent unit of the formula:

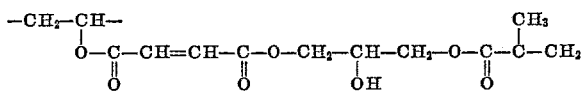

and a polymerizable compound having a low molecular weight of the formula:

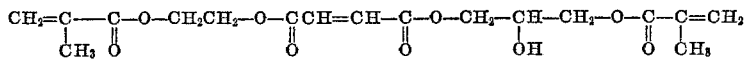

(b) Polyhydric alcohols having at least two hydroxyl groups

This group includes ethylene glycol, propylene glycol, 2,2-dimethyl-1,3-propane diol, 1,3-butane diol, 1,10-decane diol and the like.

If a coating composition is prepared using a solvent containing ethylene glycol, the resultant coating composition contains a compound having active double bonds, of the formula:

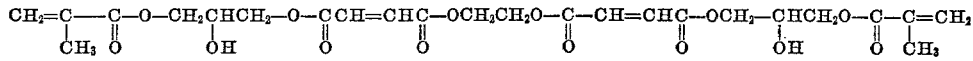

(c) Unsaturated carboxylic acids

This group includes α,β-ethylenically unsaturated carboxylic acids such as acrylic acid, methacrylic acid, itaconic acid, and α-methylene glutaric acid, maleic acid, fumaric acid and acids of the formulas:

HOOC—CH=CH—COCH$_2$COCH$_2$CH$_2$COOH and

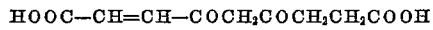

These carboxylic acids do not react with any unsaturated carboxylic acid anhydride being contained in the first esterification system, but produce polymerizable compounds in the second esterification and/or etherification system. For example, itaconic acid added into the coating composition preparation system is converted into a compound of the formula:

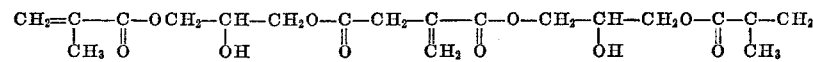

in the second system.

(d) Saturated polyhydric carboxylic acids

The group includes succinic acid, adipic acid, sebacic acid, phthalic acid, isophthalic acid, terephthalic acid, 2,5-dimethyl terephthalic acid, thiovalerianic acid, trimellitic acid, tetrahydrophthalic acid, hymic acid (3,6-endomethylene-Δ$^4$-phthalic acid), diglycollic acid, dodecyl succinic acid and the like. These carboxylic acids are converted into polymerizable compounds in the second esterification and/or etherification step. For example, succinic acid is converted into a compound of the formula:

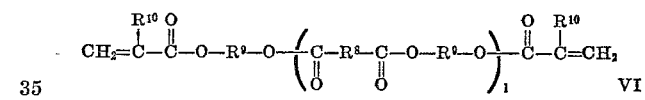

in the second system.

The compounds as stated above are very active with respect to polymerization by means of radiation energy owing to at least two double bonds therein. Further, the compounds can easily copolymerize with the prepolymer in the coating composition. Therefore, the coating composition containing the polymerizable compound has a high curing property and a high gelation effect.

Furthermore, since the polymerizable compounds are liquid and have a low volatility at room temperature, they can be easily handled compared with other vinyl monomers.

Usually, these polymerizable compounds are prepared during the prepolymer preparing process. But, the polymerizable compound may be prepared in an individual reaction system and then mixed into the coating composition. Also, compounds of the Formula VI:

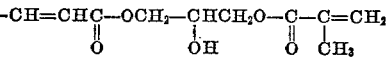

wherein $R^8$ represents a divalent hydrocarbon group having 2 to 10 carbon atoms, $R^9$ represents a saturated divalent hydrocarbon having 2 to 10 carbon atoms, $R^{10}$ represents hydrogen atom or methyl group and $l$ represents 0 or an integer of 1 to 10, are usable for the coating composition of the present invention.

The coating compositions containing the compounds of the Formula VI can be easily cured by radiation energy and the resultant film coatings have excellent features.

The compounds of the Formula VI in which $l$ is 1, may be prepared by the following processes (1), (2) and (3).

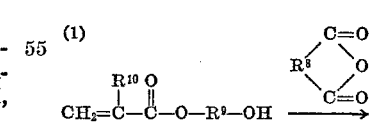

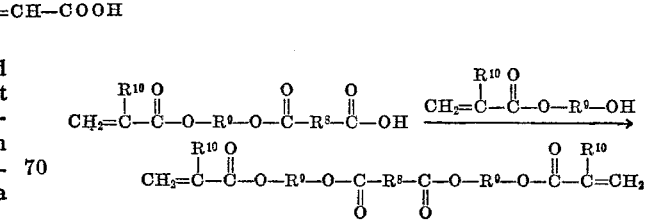

(2)
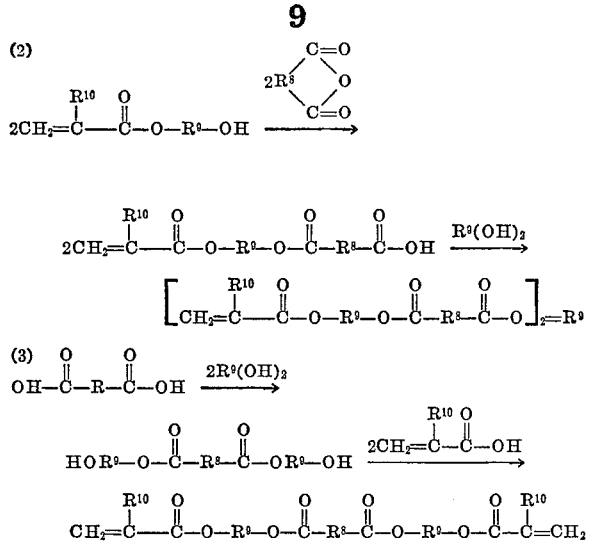

The compound of the formula:

$$CH_2=C(R^{10})-C(=O)-O-R^9-OH$$

may be selected from the same group illustrated hereinbefore as compounds of Formula I. Also, the compound of the formula:

may be selected from the same group illustrated hereinbefore as the first esterifying agents, particularly, maleic acid anhydride, itaconic acid anhydride, α-methylene glutaric acid anhydride, succinic acid anhydride, hymic acid anhydride and citraconic acid anhydride are useful for preparation of the compound of Formula VI.

Still also, the typical compounds of the formula:

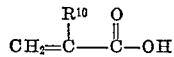

are acrylic acid and methacrylic acid.

The present invention includes a coating composition comprising a prepolymer in which the base copolymer further comprises a vinyl monomeric polymerization unit C different from the polymerization units A and B. The unit C may be selected from monovinyl aromatic compounds such as styrene, α-methyl styrene, p-chlorostyrene and vinyl toluene; ethylenically unsaturated nitriles such as acrylonitrile, methacrylonitrile and α-methylene glutaronitrile; aliphatic vinyl esters such as vinyl acetate and vinyl propionate; vinyl chloride, vinylidene chloride, allyl chloride, methallyl chloride, acrylamide, methacrylamide, N-butoxymethyl acrylamide, diacetone acrylamide, acrylic acid, methacrylic acid and methyl maleate. The selection of the unit C may be carried out from consideration of coating properties to be produced in the coating film by radiation curing. Preferably, the prepolymer comprising the polymerization unit C consists of 1 to 50% by weight of the unit A, 30 to 99% by weight of the unit B and at most 69% by weight of the unit C. Also, the polymerization unit C may be selected from vinyl monomers having a tertiary amine group such as compounds of the Formula IV:

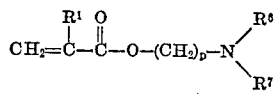

wherein $R^1$, $R^6$, $R^7$ and $p$ are the same as defined hereinbefore, respectively, N-dimethyl acrylamide, N-dimethyl methacrylamide, 2-vinyl pyridine, 2-methyl-5-vinyl pyridine, 3-ethyl-5-vinyl pyridine, 5-butyl-2-vinyl pyridine, and the like.

In case the base copolymer comprises the polymerization unit C selected from the vinyl monomers having a tertiary amine group, the base copolymer may further comprise a polymerization unit D selected from vinyl monomers different from the polymerization units A, B and C. In such case, preferably, contents of the polymerization units A, B, C and D in the base copolymer are 1 to 50, 30 to 99, 0.5 to 20 and at most 68.5% by weight, respectively.

The polymerization unit D may be selected from monovinyl aromatic compounds such as styrene, α-methyl styrene, p-chlorostyrene, and vinyl toluene; ethylenically unsaturated nitriles such as acrylonitrile, methacrylonitrile and α-methylene glutaronitrile; aliphatic vinyl esters such as vinyl acetate and vinyl propionate; vinyl chloride, vinylidene chloride, allylchloride, methallyl chloride, acrylamide, methacrylamide, N-butoxymethyl acrylamide, diacetone acrylamide and methyl maleate.

Usually, the coating composition of the present invention may be cured using an electron beam accelerator under condition wherein the accelerating voltage is 0.1 to 2.0 kev., and dose rate of the electron beam is 0.1 to 20 mrad/sed.

Also, the coating composition of the present invention may be cured by the irradiating of light having a wavelength of 2000 to 8000 A.

In case the coating composition is cured by light, a photo-polymerization sensitizer such as azo-type compounds, thiuram-type compounds, peroxides, and carbonyl compounds, preferably, benzoin, benzoin methyl ether, anthraquinone and their derivatives should be added to the coating composition in order to accelerate the curing reaction.

The coating composition of the present invention can be applied to various uses by itself or in an enamel form in which the coating composition is mixed with some coloring materials such as dyestuff, pigment, metallic powder and the like.

The base materials suitable for applying the coating material of the present invention are inclusive of metal, concrete, asbestos, and glass materials and materials unpreferable for heating to a high temperature, such as paper, plastics, natural fibers, synthetic fibers, soft fiber boards and hard fiber boards.

As is clear in the above illustration, the coating compositions of the present invention are suitable for radiation curing by irradiating electron beams, ultra-violet rays and the like, and for providing various film coatings having excellent coating features.

Various practices of the present invention are illustrated by the following examples. These examples are intended merely to illustrate the present invention and not in any sense to limit the manner in which the present invention can be practiced.

The parts and percentages recited therein and all through this specification, unless specifically provided otherwise, refer to parts by weight and percentage by weight.

EXAMPLE 1

Preparation of base copolymer (I)

A mixture containing 25 parts by weight of 2-hydroxyethyl methacrylate, 20 parts of methyl methacrylate, 35 parts of styrene, 20 parts of n-butyl acrylate, 3 parts of t-dodecyl mercaptane, 2 parts of azo-bis-isobutylonitrile and 10 parts of methanol was charged into a screw-type continuous bulk polymerization reactor, and heated to 100° C. for 1 hour. After the polymerization is completed, remaining monomer and methanol in the reactor were continuously evaporated, and therefore, a base copolymer (I) containing hydroxyl groups were obtained. The resultant base copolymer (I) had an average molecular weight of approximately 8,000 which was determined by way of the osmotic pressure method.

EXAMPLE 2

Preparation of base copolymer (II)

A mixture containing 25 parts of methyl-(2-hydroxyethyl) maleate, 20 parts of methyl methacrylate, 35 parts of styrene, 20 parts of n-butyl acrylate, 3 parts of t-dodecyl mercaptane, 2 parts of azo-isobutylonitrile and 10 parts of methanol was subjected to the same polymerization indicated in Example 1. The resultant base copolymer (II) had an average molecular weight of approximately 7,500.

EXAMPLE 3

Preparation of base copolymer (III)

A mixture containing 30 parts of methyl-(2-hydroxyethyl)itaconate, 30 parts of methyl methacrylate, 20 parts of n-butyl methacrylate, 3 parts of t-dodecyl mercaptane, 2 parts of azo-bis-isobutylonitrile, and 10 parts of methanol was subjected to the same polymerization indicated in Example 1. The resultant base copolymer (III) had an average molecular weight of approximately 9,000.

EXAMPLE 4

Preparation of base copolymer (IV)

A mixture containing 30 parts of 2-hydroxyethyl acrylate, 20 parts of styrene, 20 parts of methyl methacrylate, 30 parts of 2 - ethylhexyl methacrylate, 3 parts of n-dodecyl mercaptane, 4 parts of benzoyl peroxide and 10 parts of methanol was polymerized in the same manner stated in Example 1. The resultant base copolymer (IV) had an average molecular weight of approximately 7,000.

EXAMPLE 5

Preparation of base copolymer (V)

A mixture containing 35 parts of 2 - hydroxypropyl methacrylate, 20 parts of methyl methacrylate, 40 parts of n-butyl methacrylate, 5 parts of dimethylaminoethyl methacrylate, 3 parts of t-dodecyl mercaptane, 2 parts of azo-isobutylonitrile and 10 parts of methanol was polymerized in the same manner stated in Example 1. The resultant base copolymer (V) had an average molecular weight of approximately 8,000.

EXAMPLE 6

100 parts of the base copolymer (I) described in Example 1 was dissolved in a solvent mixture containing 100 parts of methyl methacrylate, 50 parts of styrene and 0.05 part of hydroquinone monomethyl ether. Further, 20 parts of maleic anhydride and 5 parts of dimethylaminoethyl methacrylate were added into the solution. The resultant solution was heated at 90° C. for 2 hours in order to additionally react maleic anhydride with the base copolymer (I). Through the additional reaction, 95% of the hydroxyl groups of the base copolymer (I) were esterified with the maleic anhydride. Next, 30 parts of glycidyl methacrylate were further added into the reaction solution and the reaction solution was heated at 90° C. for 4 hours. Through the second additional reaction, all of the carboxyl groups of the esterified base copolymer was esterified by the epoxy groups of the added glycidyl methacrylate. The degrees of esterifications were determined by an acid value measurement. The resultant copolymer composition was applied to a printed hard board with a thickness of 100μ, and radiated with electron rays under a condition wherein accelerating voltage was 300 kw., electric current 20 ma., dose rate 3 mrad/sec. The film coating on the board was sufficiently cured at a dosage of 6 mrad. The resultant film coating had high gloss, excellent organic solvent resistance, excellent boiling water resistance and excellent weathering resistance.

EXAMPLE 7

100 parts of the base copolymer (II), as described in Example 2, was dissolved into a solvent mixture containing 50 parts of n-butyl methacrylate, 50 parts of 2-ethyl hexyl acrylate, 70 parts of vinyl toleune and 0.05 part of hydroquinone monomethyl ether. 15 parts of succinic acid anhydride and 5 parts of dimethyl aminoethyl methacrylate were added to the solution. The reaction solution was heated at 100° C. for 1 hour in order to carry out the primary esterifying reaction of the base copolymer (II). After the first esterifying reaction, 20 parts of glycidyl acrylate were further added to the reaction solution, and the added reaction solution was further heated at 100° C. for 3 hours in order to secondarily esterify and/or etherify the firstly esterified base copolymer. The resultant composition was coated on the surface of a steel panel and the film coating thus formed was radiated under the same conditions stated in Example 6.

The film coating was sufficiently cured at a dosage of 4 mrad.

EXAMPLE 8

100 parts of the base copolymer (III), as described in Example 3, was dissolved into a solvent mixture containing 150 parts of benzyl methacrylate and 0.05 part of hydroquinone monomethyl ether, and then 20 parts of itaconic acid anhydride and 5 parts of 2-methyl-5-vinyl pyridine were added to the solution. The reaction solution was heated at 100° C. for 2 hours in order to firstly esterify the base copolymer (III). Next, 20 parts of allyl glycidyl ester were added into the primary esterifying reaction solution and the added reaction solution was further heated at 100° C. for 3 hours in order to secondly esterify and/or etherify the firstly esterified base copolymer. 100 parts of the resultant composition was mixed with 2 parts of benzoin methyl ether in order to obtain a coating composition. The coating composition was coated on the surface of a glass plate and the film coating was radiated with ultraviolet rays for 1 minute at a position just below 10 cm. from a high pressure mercury arc lamp having a dominant wave-length of 3600 A. and a power of 800 w. From the radiation, the film coating was sufficiently cured.

EXAMPLE 9

100 parts of the base copolymer (IV) described in Example 4 was dissolved in a solvent mixture containing 100 parts of ethyl acetate and 100 parts of toluene, and then 0.05 part of hydroquinone monomethyl ether, 25 parts of maleic acid anhydride and 5 parts of dimethyl aminomethyl methacrylate were added to the solution.

The solution was heated at 75° C. for 4 hours to firstly esterify the base copolymer (IV). Next, 40 parts of glycidyl methacrylate and 3 parts of dimethyl aminoethyl methacrylate were added to the primary esterifying reaction solution, and the added reaction solution was further heated at 75° C. for 8 hours to secondly esterify and/or etherify the firstly esterified base copolymer (IV).

Finally, 0.5% of anthraquinone was added to 100 parts of the resultant reaction solution in order to prepare a coating composition. The coating composition was applied on the surface of an aluminum plate with a thickness of 20μ, by way of spray coating and dried by blowing hot air of 50° C. thereon. The film coating formed on the aluminum plate surface was cured by ultra-violet rays for 3 minutes under the same conditions described in Example 8, and was satisfactorily fixed to the aluminum plate surface.

The cured film had an insolubility of 92% by weight with respect to acetone.

EXAMPLE 10

A solution of 100 parts of the base copolymer (V) described in Example 5, 100 parts of cyclohexyl methacrylate, 70 parts of styrene and 0.05 part of hydroquinone monomethyl ether was prepared, 25 parts of maleic acid anhydride was added to the solution and the added reaction solution was heated at 100° C. for 1 hour in order to firstly esterify the base copolymer (V). 75 parts of ethylene glycol and 25 parts of succinic acid anhydride were further added to the reaction solution and the reaction solution was heated at 100° C. for 2 hours in order to continue the first esterifying. Next, 70 parts of glycidyl methacrylate and 0.05 part of hydroquinone monomethyl ether were further added to the reaction solution and the reaction solution was heated at 90° C. for 5 hours in order to secondly esterify and/or etherify the firstly esterified base copolymer (V).

The resultant reaction product mainly comprised a copolymer having a unit structure of the formula:

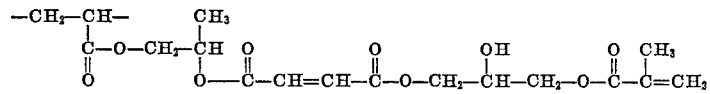

and a polymerizable compound of the formula:

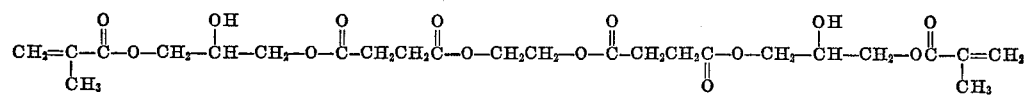

The resultant composition was applied on the surface of a steel plate so as to form a film coating of 50μ thickness. The film coating was radiated by electron rays in a nitrogen atmosphere under the same conditions stated in Example 6 and was sufficiently cured at a dosage of 3 mrad.

EXAMPLE 11

(1) Preparation of base copolymer (VI)

A base copolymer (VI) having an average molecular weight of approximately 9,000 was prepared from 30 parts of 2-hydroxyethyl methacrylate, 30 parts of methyl methacrylate, 15 parts of monomethyl itaconate, 25 parts of methacrylonitrile, 3 parts of t-dodecyl mercaptane, 2 parts of azo-isobutylonitrile and 10 parts of methanol in the same polymerization conditions stated in Example 1.

(2) Preparation of coating composition (11-1)

A solution of 100 parts of the base copolymer (VI) 100 parts of methyl methacrylate, 50 parts of styrene, and 0.05 part of hydroquinone monomethyl ether were prepared. 40 parts of hymic acid anhydride and 5 parts of dimethylaminoethyl methacrylate were added to the solution. The added reaction solution was heated at 90° C. for 2 hours to firstly esterify the base copolymer (VI). Next, 30 parts of glycidyl methacrylate were further added to the reaction solution, and the added reaction solution was heated at 90° C. for 4 hours to secondly esterify and/or etherify the firstly esterified base copolymer (VI). Thus, a coating composition (11-1) was obtained.

A film coating of the coating composition (11-1) was sufficiently cured by the same radiation manner, as stated in Example 10, at a dosage of 4 mrad.

(3) Preparation of coating composition (11-2)

A coating composition (11-2) was prepared from 100 parts of the base copolymer (VI) and the same component as indicated in section (2) of the present example, except that 35 parts of hexahydrophthalic acid anhydride replaced the hymic acid anhydride as a first esterifying agent, in the same manner as indicated in section (2).

The film coating of the coating composition (11-2) was sufficiently cured by the same manner, as stated in Example 10, at a dosage of 6 mrad.

EXAMPLE 12

A solution of 100 parts of the base copolymer (IV), as indicated in Example 4, in a solvent mixture containing 30 parts of 2-hydroxyethyl methacrylate, 200 parts of benzyl methacrylate and 0.1 part of hydroquinone monomethyl ether was prepared. 46 parts of succinic acid anhydride and 10 parts of dimethylaminoethyl methacrylate were added to the solution and the solution was heated at 90° C. for 3 hours in order to firstly esterify the base copolymer (IV). 70 parts of glycidyl methacrylate were further added to the reaction solution and the solution was heated at 90° C. for 6 hours to secondly esterify and/or etherify the firstly esterified base copolymer. The resultant reaction product mainly contained a copolymer having a unit structure of the formula:

$$-CH_2-CH- \quad CH_3$$
$$\begin{array}{c} | \\ C-O-CH_2-CH \quad O \quad O \quad OH \quad O \quad CH_3 \\ \| \quad \quad \| \quad \| \quad | \quad \| \quad | \\ O \quad \quad O-C-CH_2CH_2C-O-CH_2-CH-CH_2O-C-C-CH_2 \end{array}$$

and a polymerizable compound of the formula:

$$\begin{array}{ccc} CH_3 & & CH_3 \\ | & & | \\ CH_2=C-C-O-CH_2CH_2-O-C-CH_2CH_2C-O-CH_2CHCH_2-O-C-C=CH_2 \\ \| & \| & \| & | & \| \\ O & O & O & OH & O \end{array}$$

The film coating of the above-stated reaction product, that is, coating composition, was sufficiently cured at a dosage of 2 mrad of electron beams.

EXAMPLE 13

A solution of 100 parts of the base copolymer (IV), as stated in Example 4, 200 parts of benzyl methacrylate and 0.1 part of hydroquinone monomethyl ether was prepared. Then, 23 parts of succinic acid anhydride and 10 parts of dimethylaminoethyl methacrylate were added to the solution and the solution was heated at 90° C. for 3 hours to firstly esterify the base copolymer (IV). Next, 50 parts of methacrylic acid and 118 parts of glycidyl methacrylate were further added to the solution and then the added reacting solution was heated at 90° C. for 6 hours to secondly esterify and/or etherify the firstly esterified base copolymer.

The resultant reaction product, that is, coating composition, contained a polymerizable compound of the formula:

$$\begin{array}{ccc} & O & & O \\ & \| & & \| \\ CH_2=C-C-O-CH_2-CH-CH_2-O-C-C=CH_2 \\ | & | & | \\ CH_3 & OH & CH_3 \end{array}$$

The film coating of the resultant composition was sufficiently cured at a dosage of 2.5 mrad of electron beams.

EXAMPLE 14

A solution of 100 parts of the base copolymer (V), as stated in Example 5, 150 parts of benzyl methacrylate and 50 parts of a monomer of the formula:

$$\begin{array}{cc} CH_2 & CH_3 \\ \| & | \\ C-CH_2-CH_2-CH \\ | & | \\ COOCH_3 & COOCH_3 \end{array}$$

and 0.1 part of hydroquinone monomethyl ether was prepared. 23 parts of succinic acid anhydride were added to the solution and the solution was heated at 90° C. for 3 hours to esterify the base copolymer (V). Next, 29 parts of succinic acid anhydride and 105 parts of glycidyl methacrylate were further added to the solution. The solution was heated at 90° C. for 6 hours to secondly esterify and/or etherify the firstly esterified base copolymer.

The resultant reaction product, that is, coating composition was coated on a steel plate surface and sufficiently cured at a dosage of 4 mrad of electron rays under the same conditions as indicated in Example 6.

EXAMPLE 15

A coating composition was prepared in the same manner as indicated in Example 14 from 100 parts of the base copolymer (VI); a mixture of 250 parts of benzyl methacrylate and 0.1 part of hydroquinone monomethyl ether; a primary esterifying agent containing 23 parts of succinic acid anhydride and 10 parts of dimethylaminoethyl methacrylate; and a secondary esterifying agent of 35 parts of glycidyl methacrylate.

After the reactions were completed, an acid value of the reacting solution was approximately zero.

The film coating of the resultant composition was sufficiently cured at a dosage of 5 mrad of electron beams in the same manner as stated in Example 6.

EXAMPLE 16

A mixture of 130 parts (1 mol equivalent), of 2-hydroxyethyl acrylate, 100 parts (1 mol equivalent) of succinic acid anhydride and 0.5 parts of hydroquinone monomethyl ether was charged into a reactor filled with nitrogen gas and heated at 130° C. for 20 minutes. 97 parts (1 mol equivalent) of bisphenol A, 400 parts of toluene and 3 parts of p-toluenesulfonic acid were further added into the reactor and the reaction solution was heated at a reflux temperature for 4 hours. Thus, 15.5 parts of condensation water were distilled off from the reaction system. The resulted reaction solution was neutralized to a pH 7 by addition of sodium bicarbonate. Then, p-toluenesulfonic salt was precipitated. After the precipitate was filtered, toluene in the solution was evaporated and a transparency mainly containing a liquid compound of the formula;

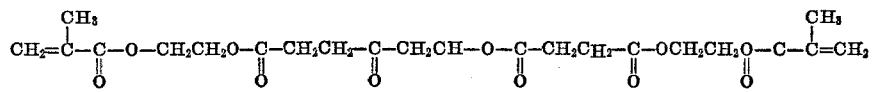

was obtained. The compound had a viscosity of T which was determined by way of a Gardner-Holdt bubble viscometer. A coating composition was prepared from 70 parts of the composition stated in Example 6 and 30 parts of the above-stated composition and coated on a steel plate surface so as to form a film coating having a thickness of 30μ.

The film coating was sufficiently cured at a dosage of 2 mrad of electron rays.

EXAMPLE 17

130 parts of 2-hydroxyethyl methacrylate and 100 parts of succinic acid anhydride were reacted in the same manner as stated in Example 16. To the resultant reacting solution, 130 parts of 2-hydroxyethyl methacrylate, 300 parts of toluene and 2 parts of p-toluenesulfonic acid were added and heated at 110° C. for 5 hours for dehydrocondensation of the added components with distillation of 16.0 parts of condensation water. The resultant condensation product was treated in the same manner as stated in Example 16 and thus, a liquid mainly containing a compound of the formula:

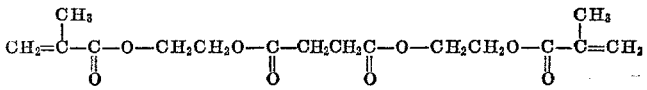

was obtained. A coating composition was prepared from 40 parts of the liquid compound and 60 parts of the reaction product of Example 7, and then coated on a steel panel and cured in the same manner stated in Example 7. The film coating was sufficiently cured at a dosage of 3 mrad of electron beams. The cured film had a high adhesiveness to the steel surface and an excellent impact resistance.

EXAMPLE 18

After 98 parts of maleic acid anhydride and 130 parts of 2-hydroxyethyl methacrylate were reacted in the same manner stated in Example 16, 38 parts of 1,3-butylene glycol, 400 parts of toluene and 3 parts of p-toluenesulfonic acid were added to the reaction solution and treated in the same manner stated in Example 16. As a result of the treatment, a transparency liquid mainly containing a compound of the formula:

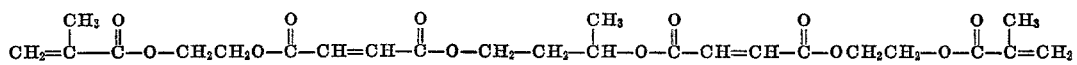

was obtained.

A coating composition was prepared from 30 parts of the resultant liquid and 70 parts of the reaction product obtained in Example 7, coated on a steel plate so as to form a film coating having a thickness of 40μ and radiated by electron beams in the same manner indicated in Example 7. The film coating was sufficiently cured at a dosage of 2.5 mrad. The cured film had very excellent flexibility, adhesiveness to steel, impact resistance and weathering resistance.

EXAMPLE 19

To a reaction solution obtained by a reaction of 130 parts of 2-hydroxyethyl methacrylate and 100 parts of succinic acid anhydride, 31 parts of ethylene glycol, 400 parts of toluene and 3 parts of p-toluenesulfonic acid were added and subjected to the same treatment stated in Example 16. Thus, a reaction liquid mainly containing a compound of the formula:

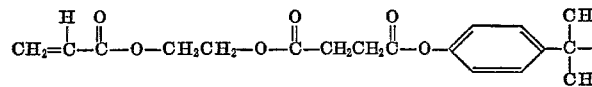 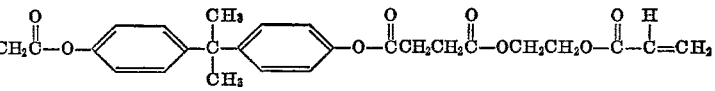

was obtained.

A coating composition (19–1) was prepared from 40 parts of the above-obtained liquid and 60 parts of the composition (11–1) stated in Example 11, and coated on a steel plate surface.

The film coating was sufficiently cured at a dosage of 2.5 mrad of electron beams. The cured film had excellent impact resistance, flexibility and adhesivenes to the steel panel.

Also, a coating composition (19–2) was prepared from 40 parts of the above-obtained liquid and 60 parts of the composition (11–2) stated in Example 11, and coated on a steel panel. The film coating was sufficiently cured at a dosage of 3 mrad of electron beams. The cured film had excellent features.

EXAMPLE 20

A mixture of 188 parts of methyl-(2-hydroxyethyl) itaconate, 98 parts of maleic acid anhydride, 2 parts of dimethylaminoethyl methacrylate and 0.1 parts of hydroquinone monomethyl ether was charged into a reactor and heated at 100° C. for 1 hour. A mixture of 149 parts of glycidyl methacrylate and 1 part of dimethylaminoethyl methacrylate was further charged into the reactor and heated at 100° C. for 5 hours. From the reaction, a liquid mainly containing a compound of the formula:

$$CH_2=C(C(O)OCH_3)-CH_2-C(O)-O-CH_2CH_2O-C(O)-CH=CH-C(O)-O-CH_2-CH(OH)-CH_2-O-C(O)-C(CH_3)=CH_2$$

was obtained.

A coating composition was prepared from 30 parts of the above-stated liquid and 70 parts of the composition indicated in Example 17 and coated on a steel panel surface. The film coating was sufficiently cured at a dosage of 2.5 mrad of electron beams. The cured film had high hardness and excellent weathering resistance.

EXAMPLE 21

174 parts of methyl-(2-hydroxyethyl) maleate and 98 parts of maleic acid anhydride were subjected to an addition reaction in the same manner indicated in Example 20 and 120 parts of allyl glycidyl ether were further added to the resultant reaction solution. The reaction mixture was treated in the same manner described in Example 20 and a liquid mainly containing a compound of the formula:

$$CH(C(O)OCH_3)=CH-C(O)-O-CH_2CH_2-O-C(O)-CH=CH-C(O)-O-CH_2-CH(OH)-CH_2-CH=CH_2$$

was obtained.

A coating composition was prepared from 30 parts of the obtained liquid and 70 parts of the composition indicated in Example 6, and a film coating formed on a printed hard board was cured at a dosage of 4 mrad of electron beams in the same manner indicated in Example 16. The cured film had a high hardness.

EXAMPLE 22

108 parts of neopentyl glycol, 186 parts of maleic acid anhydride, 3 parts of dimethylaminoethyl methacrylate and 0.1 part of hydroquinone monomethyl ether were mixed and then heated at 100° C. for 2 hours in a reactor. To the mixture, 298 parts of glycidyl methacrylate, 1 part of dimethylaminoethyl methacrylate and 0.1 part of hydroquinone monomethyl ether were added and the reaction mixture was further heated at 100° C. for 5 hours. Thus, a composition mainly containing a compound of the formula:

$$CH_2=C(CH_3)-C(O)-O-CH_2-C(OH)-CH_2-O-C(O)-CH=CH-C(O)-O-CH_2-C(CH_3)_2-CH_2O-C(O)-CH=CH-C(O)-O-CH_2-CH(OH)-CH_2O-C(O)-C(CH_3)=CH_2$$

was obtained.

A coating composition was prepared from 30 parts of the resultant liquid and 70 parts of the composition illustrated in Example 7, and a film coating of the coating composition was sufficiently cured at a dosage of 5 mrad of electron beams in the same manner indicated in Example 18. The cured film had an excellent hardness, adhesiveness to a hard board and weathering resistance.

EXAMPLE 23

146 parts of adipic acid, 298 parts of glycidyl methacrylate, 3 parts of dimethylaminoethyl methacrylate and 0.1 part of hydroquinone monoethyl ether were mixed and then heated at 100° C. for 5 hours and a liquid mainly containing a compound of the formula:

$$CH_2=C(CH_3)-C(O)-O-CH_2-CH(OH)-CH_2-O-C(O)-(CH_2)_4-C(O)-O-CH_2-CH(OH)-CH_2-O-C(O)-C(CH_3)=CH_2$$

was obtained.

A coating composition was prepared from 70 parts of the resultant liquid and 30 parts of the composition illustrated in Example 6, and a film coating of the coating composition was sufficiently cured at a dosage of 1.5 mrad of electron beams. The cured film had excellent hardness, adhesiveness to a hard board and weathering resistance.

EXAMPLE 24

128 parts of glycidyl acrylate, 72 parts of acrylic acid and 2 parts of dimethylaminoethyl methacrylate were mixed and then heated at 100° C. for 5 hours in reactor. 30 parts of the resultant product and 70 parts of the composition illustrated in Example 6 were mixed and a coating composition resulted. A film coating of the coating composition formed on a hard board was irradiated by electron beams at a dosage of 2.5 mrad. A completely hardened film having excellent hardness, weathering resistance and chemical resistance property was obtained.

EXAMPLE 25

142 parts of glycidyl methacrylate, 100 parts of succinic acid anhydride, 1 part of dimethylaminoethyl methacrylate and 0.05 part of hydroquinone monomethyl ether was charged into a reactor together with a small quantity of water and heated at 100° C. for 6 hours. The reaction resulted in a composition product mainly containing a compound of the formula:

$$HO-C(O)-CH_2CH_2-C(O)-O-\left[-CH_2-CH(CH_2-O-C(O)-C(CH_3)=CH_2)-O-C(O)-CH_2CH_2-C(O)-O-\right]_q-CH_2CH(OH)-O-C(O)-C(CH_3)=CH_2$$

wherein $q$ is an average number of 2.

A coating composition was prepared from 50 parts of the resultant product and 50 parts of the composition illustrated in Example 7, and formed into a film coating on a steel plate surface. The film coating was irradiated by electron beams at a dosage of 1.5 mrad and thus sufficiently cured. The cured film had excellent adhesiveness to a steel panel, excellent hardness and chemical resistance property.

EXAMPLE 26

An unsaturated alkyd resin was obtained from 62 parts of ethylene glycol and 49 parts of maleic acid anhydride and 73 parts of adipic acid.

A coating composition was prepared from 30 parts of the obtained unsaturated alkyd resin and 70 parts of the composition illustrated in Example 7, coated on a steel panel so as to form a film coating. The film coating was irradiated at a dossage of 4 mrad by electron rays in the same manner indicated in Example 7, and thus sufficiently cured. The cured film had excellent adhesiveness to a steel panel hardness, excellent impact resistance and weathering resistance.

What is claimed is:

1. A coating composition comprising a prepolymer containing the following components,
   (1) a base copolymer having an average molecular weight of 1,000 to 100,000 and comprising the following units,
      (a) polymerized units A of at least one vinyl monomer having a hydroxyl group selected from the group consisting of allyl alcohol, methallyl alcohol, hydroxyalkyl acrylamide, hydroxylalkyl methacrylamide and compounds of the formula I, II, and III,

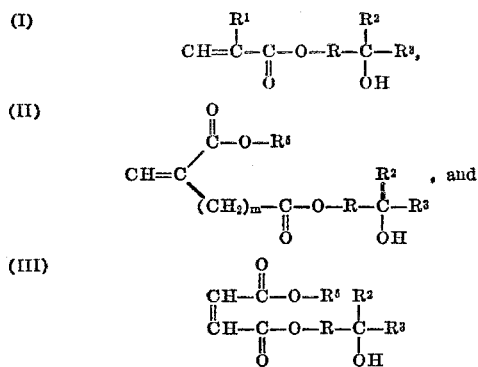

in which R¹, R² and R³ each represents a hydrogen atom or methyl group, R represents

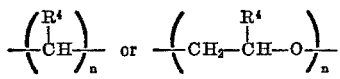

in which R⁴ represents a hydrogen atom or methyl group and n represents an integer of 1 10, R⁵ represents a hydrogen atom or alkyl group of 1 to 12 carbon atoms, and m is 1 or 2,
      (b) polymerized units B of at least one α,β-ethylenically unsaturated carboxylic acid ester of a monohydric alcohol having 1 to 18 carbon atoms,
   (2) at least one polybasic carboxylic acid anhydride which initially esterifies at least 10 mol percent of said hydroxyl groups of said base copolymer with the carboxyl group thereof, and
   (3) at least one epoxy vinyl monomer selected from the group consisting of glycidyl acrylate, glycidyl methacrylate, allyl glycidyl ether, methallyl glycidyl ether or vinyl cyclohexene monooxide, said epoxy vinyl monomer subsequently esterifying and/or etherifying at least 10 mol percent of the total content of said hydroxyl group and carboxyl group of said initially esterified base copolymer with the epoxy group thereof.

2. A coating composition as claimed in claim 1 wherein said base copolymer also includes polymerized units C of at least one compound selected from the group consisting of styrene, α-methylstyrene, o-, m-, or p-chlorostyrene, vinyl toluene, acrylonitrile, methacrylonitrile, α-methylene glutaronitrile, vinyl acetate, vinyl propionate, vinyl chloride, vinylidene chloride, allyl chloride, methallyl chloride, acrylamide, methacrylamide, N-butoxymethylacrylamide, diacetone acrylamide and basic vinyl compounds of the Formula IV:

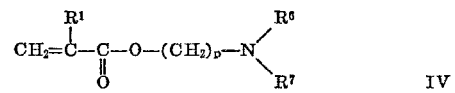

wherein R¹ represents a hydrogen atom or methyl group, R⁶ and R⁷ represent a methyl or ethyl group, and p is 1 or 2, N-dimethyl acrylamide, N-dimethyl methacrylamide, 2-vinyl pyridine, 2-methyl-5-vinyl pyridine, 3-ethyl-5-vinyl pyridine and 5-butyl-2-vinyl pyridine, said polymerized units C being different from said polymerized units A and B.

3. A coating composition as claimed in claim 2, wherein said base copolymer further comprises polymerized units D different from said polymerized units A, B and C, and wherein said polymerized units D are of at least one compound selected from the group consisting of styrene, α-methyl-styrene, o-, m-, or p-chlorostyrene, vinyl toluene, acrylonitrile, methacrylonitrile, α-methylene glutaronitrile, vinyl acetate, vinyl propionate, vinyl chloride, vinylidene chloride, allyl chloride, methallyl chloride, arylamide, methacrylamide, N-butoxymethylacrylamide and diacetone acrylamide.

4. A coating composition as claimed in claim 1, wherein the contents of said polymerized units A and B in said base copolymer are 1 to 50 and 50 to 99% by weight, respectively.

5. A coating composition as claimed in claim 2, wherein the contents of said polymerized units A, B and C in said base copolymer are 1 to 50%, 30 to 99% and at most 69% by weight, respectively.

6. A coating composition as claimed in claim 3, wherein the contents of said polymerized units A, B, C and D in said base copolymer are 1 to 50, 30 to 99, 0.5 to 20 and at most 68.5% by weight, respectively.

7. A coating composition as claimed in claim 2, wherein the contents of said polymerization units A, B and C in said base copolymer are 1 to 50, 30 to 99 and 0.5 to 20% by weight, respectively.

8. A coating composition as claimed in claim 1, wherein said polymerized units B are derived from esters of (1) acrylic acid, methacrylic acid, itaconic acid or α-methylene glutaric acid and (2) straight or branched chain monohydric alkyl alcohol of 1 to 18 carbon atoms, cyclohexanol, benzyl alcohol, phenethyl alcohol, ethylene glycol mono-alkyl ether, or propylene-glycol mono-alkyl ether.

9. A coating composition as claimed in claim 1, wherein the polybasic carboxylic anhydride (2) is an anhydride of maleic acid, chlorinated maleic acid, succinic acid, itaconic acid, α-methylene glutaric acid, citraconic acid, phthalic acid, tetrahydrophthalic acid, hexahydrophthalic acid, naphthalene dicarboxylic acid, dodecyl succinic acid, or 1,4,5,6,7,7-hexachloro-bi-cyclo(2,2,1)-hept-5-en-2,3 dicarboxylic acid.

10. A process for preparing a coating composition comprising
   (1) copolymerizing a mixture of
      (a) at least one vinyl monomer having a hydroxyl group selected from the group consisting of allyl alcohol, methallyl alcohol, hydroxyalkyl acrylamide, hydroxyalkyl methacrylamide and compounds of the Formula I, II, and III,

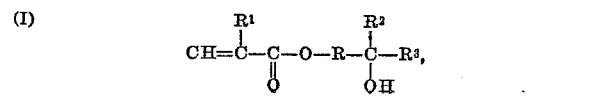

(II)

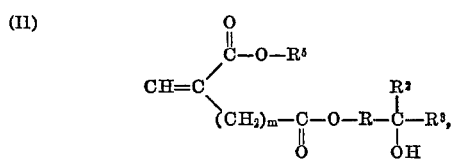

and (III)

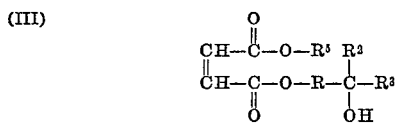

in which $R^1$, $R^2$ and $R^3$ each represents a hydrogen atom or methyl group, R represents

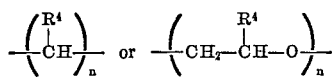

in which $R^4$ represents a hydrogen atom or methyl group and $n$ represents an integer of 1 to 10, $R^5$ represents a hydrogen atom or alkyl group of 1 to 12 carbon atoms, and $m$ is 1 or 2, and (b) at least one α,β ethylenically unsaturated carboxylic acid ester of a monohydric alcohol having 1 to 18 carbon atoms, to form a base copolymer having an average molecular weight of 1,000 to 100,000 and containing hydroxyl groups, (2) reacting at least one polybasic carboxylic acid anhydride with said base copolymer dissolved in an organic solvent in a proportion of at least 0.1 mol of the anhydride per mol of the hydroxyl groups in said base copolymer, and (3) subsequently reacting at least one epoxy vinyl monomer selected from the group consisting of glycidyl acrylate, glycidyl methacrylate, allyl glycidyl ether, methallyl glycidyl ether or vinyl cyclohexene monooxide with the resultant copolymer of step (2) in a proportion of at least 0.1 mol of said epoxy vinyl monomer per mol of the combined content of hydroxyl groups and carboxyl groups in the resultant copolymer of step (2).

11. A process as claimed in claim 10, wherein the proportions of said monomers A and B in said mixture are 1 to 50 and 50 to 99% by weight, respectively.

12. A process as claimed in claim 10, wherein said monomer mixture in step (1) also comprises a polymerizable vinyl monomer C which is at least one compound selected from the group consisting of styrene, α-methylstyrene, o-, m-, or p-chlorostyrene, vinyl toluene, acrylonitrile, methacrylonitrile, α-methylene glutaronitrile, vinyl acetate, vinyl propionate, vinyl chloride, vinylidene chloride, allyl chloride, methallyl chloride, acrylamide, methacrylamide, N-butoxymethyl-acrylamide, diacetone acrylamide and basic vinyl compounds of the Formula IV:

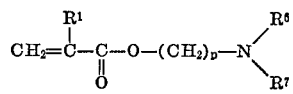

wherein $R^1$ represents a hydrogen atom or methyl group, $R^6$ and $R^7$ represent a methyl or ethyl group, and $p$ is 1 or 2, N-dimethyl acrylamide, N-dimethyl methacrylamide, 2-vinyl pyridine, 2-methyl-5-vinyl pyridine, 3-ethyl-5-vinyl pyridine and 5-butyl-2-vinyl pyridine, said vinyl monomer B being different from said monomers A and B.

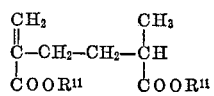

13. A process as claimed in claim 12, wherein the proportions of monomers A, B and C in said mixture are 1 to 50, 30 to 99 and at most 69% by weight, respectively.

14. A process as claimed in claim 12, wherein said monomer mixture in step (1) further comprises a polymerizable vinyl monomer D different from said monomers A, B and C, said vinyl monomer D being at least one compound selected from the group consisting of styrene, α-methyl-styrene, o-, m-, or p-chlorostyrene, vinyl toluene, acrylonitrile, methacrylonitrile, α-methylene glutaronitrile, vinyl acetate, vinyl propionate, vinyl chloride, vinylidene chloride, allyl chloride, methallyl chloride, arylamide, methacrylamide, N-butoxymethyl-acrylamide and diacetone acrylamide.

15. A process as claimed in claim 14, wherein the proportions of monomers A, B, C and D in said mixture are 1 to 50, 30 to 99, 0.5 to 20%, and at most 68.5% by weight, respectively.

16. A process as claimed in claim 10, wherein the reactions of step (2) and (3) are accelerated by at least one basic vinyl monomer selected from a member of the group consisting of a compound of the Formula VII:

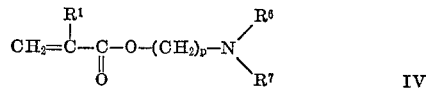

wherein $R^1$ represents a hydrogen atom or methyl group, $R^6$ and $R^7$, represent methyl or ethyl group, and $p$ is 1 or 2, N-dimethyl acrylamide, N-dimethyl methacrylamide, 2-vinyl pyridine, 2-methyl-5-vinyl pyridine, 3-ethyl-5-vinyl pyridine or 5-butyl-2-vinyl pyridine.

References Cited

UNITED STATES PATENTS 3,448,089 6/1969 Celeste _____ 260—78.5 T
3,620,990 11/1971 Cheswick et al. _____ 260—40 R WILLIAM H. SHORT, Primary Examiner E. WOODBERRY, Assistant Examiner U.S. Cl. X.R.

117—93.31, 124, 126, 127, 138.8, 148, 155; 204—159.14, 159.15, 159.19; 260—78.4 D, ED, 78.58 B, 78.5 T, 31.6, 861, 873